(12) United States Patent
Newton et al.

(10) Patent No.: US 6,516,894 B1
(45) Date of Patent: Feb. 11, 2003

(54) LEVEE BUILDER

(75) Inventors: James N. Newton, Lubbock, TX (US); Arthur E. Miller, Lubbock, TX (US); John Taylor, Lubbock, TX (US)

(73) Assignee: Miller-Newton Joint Venture, Lubbock, TX (US)

( * ) Notice: Subject to any disclaimer, the term of this patent is extended or adjusted under 35 U.S.C. 154(b) by 0 days.

(21) Appl. No.: 09/657,700

(22) Filed: Sep. 8, 2000

Related U.S. Application Data

(60) Provisional application No. 60/154,292, filed on Sep. 16, 1999.

(51) Int. Cl.$^7$ ................................................ A01B 79/00
(52) U.S. Cl. ..................... 172/1; 172/445.2; 172/686; 172/684.5; 172/701; 172/195
(58) Field of Search ................... 172/799.5, 72, 172/441, 445.1, 445.2, 684.5, 685, 686, 701, 701.1, 1, 195; 37/266, 267, 268, 220, 195

(56) References Cited

U.S. PATENT DOCUMENTS

| | | | |
|---|---|---|---|
| 1,188,184 A | | 6/1916 | Koch |
| 1,297,117 A | | 3/1919 | Dupler |
| 2,153,451 A | | 4/1939 | Brelsford |
| 3,760,885 A | * | 9/1973 | McKenzie |
| 4,073,245 A | * | 2/1978 | Anderson |
| 4,291,770 A | * | 9/1981 | Engler |
| 4,431,061 A | * | 2/1984 | White |
| 4,506,741 A | * | 3/1985 | Hula, Jr. |
| 4,731,942 A | * | 3/1988 | Eberle |
| 4,903,782 A | * | 2/1990 | McClellan |
| 5,697,731 A | * | 12/1997 | Bonds |
| 5,794,709 A | * | 8/1998 | Clausen |
| 5,906,243 A | * | 5/1999 | Clausen |
| 5,960,890 A | * | 10/1999 | Crain |

FOREIGN PATENT DOCUMENTS

DE 617495 * 11/1933 .................. 172/195

* cited by examiner

Primary Examiner—Victor Batson
(74) Attorney, Agent, or Firm—Wendell Coffee

(57) ABSTRACT

A process for and a machine which builds levees in gumbo with moldboards which have knives welded to a blade which makes strips and then lumps of a sheet of gumbo. The machine is attached to a tractor by a three point hitch. The moldboards are adjusted by plates and discs which are connected by bolts in various holes in the plates and discs. A push board is attached to the rear of the machine for repairing damaged levees.

2 Claims, 4 Drawing Sheets

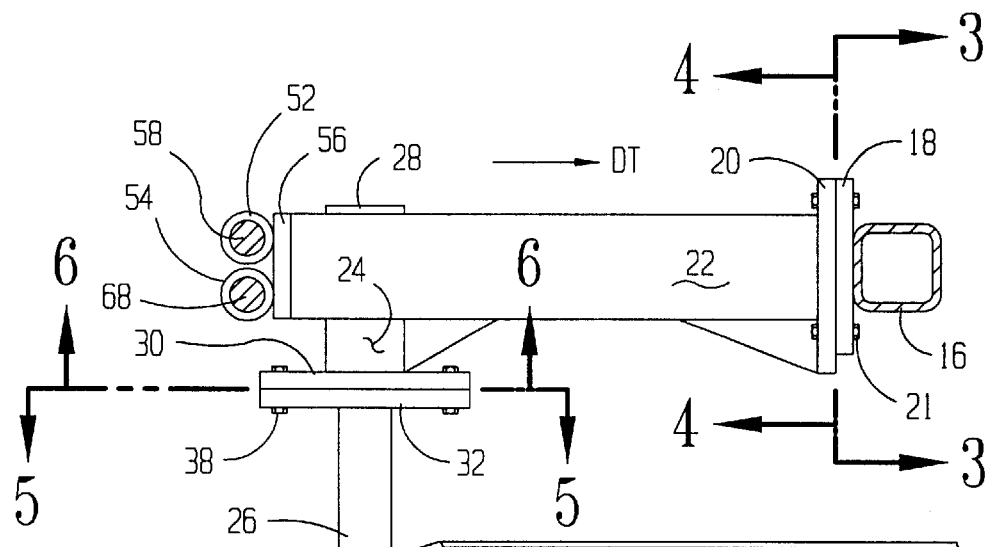
FIG 2
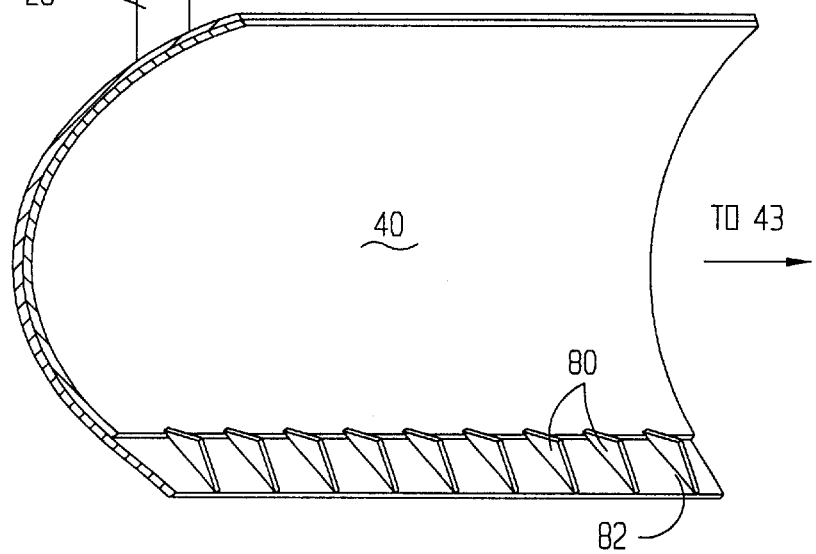
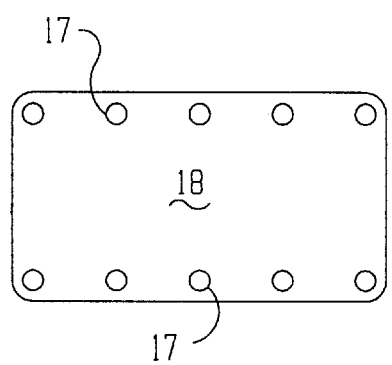
FIG 3
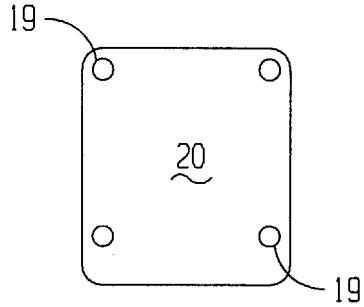
FIG 4

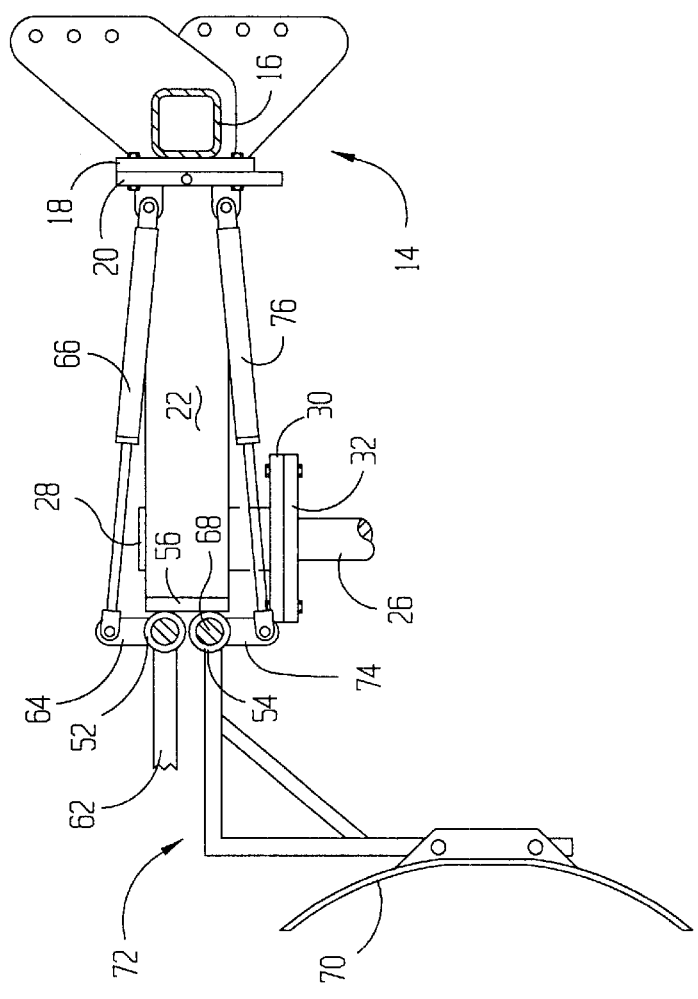
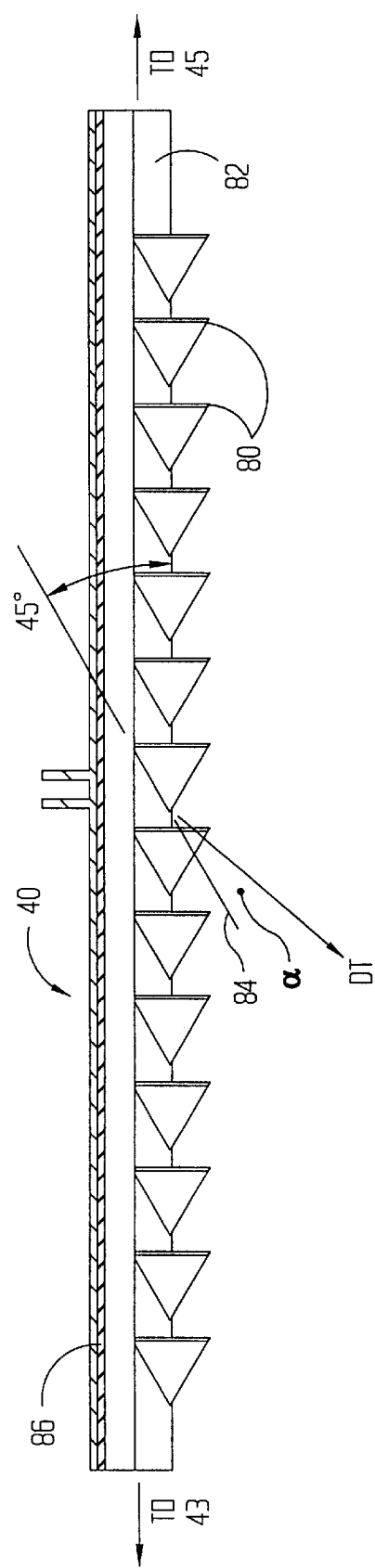

LEVEE BUILDER

CROSS REFERENCE TO RELATED APPLICATION

Provisional Patent Application

This application claims the benefit of U.S. Provisional Application No. 60/154,292, filed Sep. 16, 1999.

BACKGROUND OF THE INVENTION (1) Field of the Invention

This invention relates to the method of and the machines for building, repairing, and maintaining levees or dikes or borders. In the cultivation of certain crops it is desired that the land be prepared for flooding by building levees. An example of such agriculture practice is in growing rice. Farmers who levee crop land have ordinary skill in this art.

(2) Description of the Related Art

Before this invention, levee builders were know. For example, the Marliss Division of Sukup Manufacturing Company of Jonesboro, Arkansas build and marketed the "Levee King".

The basic form of the levee builders had opposing long moldboards which plowed the earth and moved it to a center position between the two moldboards. The equipment was normally supported primarily by wheels although a portion of the weight was born by the hitch on the tractor. The prior art equipment often had a series of plows which would cultivate the strip that the elongated moldboards had taken the earth from to form the levee. Seed from a hopper was often sewn in this scraped area to be covered by the plows.

The levee builders having moldboards which have been on the market are characterized by being towed behind a tractor. The prior levee builders with moldboards were not mounted upon three-point hitches as are many agriculture implements.

Also, levee builders with disc plows are used to transfer the earth on either side into the levee. Normally such units are lighter in weight and therefore are often attached by three-point hitches to the towing tractor.

Some of the levees are built in fields having gumbo. The gumbo is fine grained silted soils which are heavy and very sticky.

In some cases moldboards are covered with a synthetic material to reduce the adhesion of a sheet of gumbo as it moves across the moldboard.

Some non-elongated moldboards (not used in levee building) have ribs or knives on the plow share or on the moldboard to pulverize the soil. Examples of this specifically include KOCH, U.S. Pat. No. 1,188,184, patented Jun. 20, 1916, DUPLER U.S. Pat. No. 1,297,117 patented Mar. 11, 1919, and BLEDSFORD U.S. Pat. No. 2,153,451 patented Apr. 4, 1939.

SUMMARY OF THE INVENTION (1) Proqressive Contribution to the Art

This invention has two elongated moldboards, each moldboard is about six feet long, two feet from the bottom to the top and has a radius of curvature of about 16 inches. A blade is attached to the bottom of the moldboard for the entire length. Triangular knives are welded to the blade to cut the sheet of gumbo into ribbons. Placing the knives at an angle to the direction of travel, cause the gumbo to break up into lumps. In lighter soil the knives would crumble the soil if used.

The levee builder is attached to the tractor by a conventional three-point hitch. Therefore the depth of the blades may be adjusted by the operator as the levees are being built. Also the moldboards may be lifted from the soil as desired.

Behind and parallel to the tool bar are two shafts. An upper shaft has the plows attached to it. By rotating the shaft the plows are lowered to plow the soil or raised as desired. A lower shaft has a push board attached. Occasionally, the levees are cut. It is necessary that soil be pushed from the sides into the cut to restore the levee. The push board is lowered by rotating the lower shaft into a pushing position. The elongated moldboard are lifted clear of the soil. Therefore the same implement can be converted from a levee builder to a levee maintainer.

(2) Objects of this Invention

An object of this invention is to provide a levee builder which may be used in lighter soils or heavier gumbo.

Another object of this invention is to provide a levee builder with moldboards which may be carried on a three-point hitch giving greater versatility to its movement.

Another object of this invention is to provide a levee builder which may also be used to repair levees with only the manipulation of controls from the operators position on the tractor.

Also an object of this invention is to provide a levee builder which is sufficiently rugged so that it can be used for heavy duty work with minimum repairs to the builder.

A further object is to provide a levee builder which retains all adjustments during hard use and mistreatment.

Further objects are to achieve the above with devices that are sturdy, compact, durable, simple, safe, efficient, versatile, ecologically compatible, energy conserving, and reliable, yet inexpensive and easy to manufacture, operate, and maintain.

Other objects are to achieve the above with a method that is rapid, versatile, ecologically compatible, energy conserving, efficient, and inexpensive, and does not require highly skilled people to operate and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS:

FIG. 2 is a sectional elevational view taken substantially on line 2—2 of FIG. 1.

FIG. 3 is an elevational view of the tool bar plate taken substantially on line 3—3 of FIG. 2.

FIG. 4 is an elevational view of the arm plate taken substantially on line 4—4 of FIG. 1.

FIG. 7 is a sectional elevational view taken substantially on line 7—7 of FIG. 1.

FIG. 9 is a sectional plan view taken substantially on line 9—9 of FIG. 8.

CATALOGUE OF ELEMENTS

Figure 1:
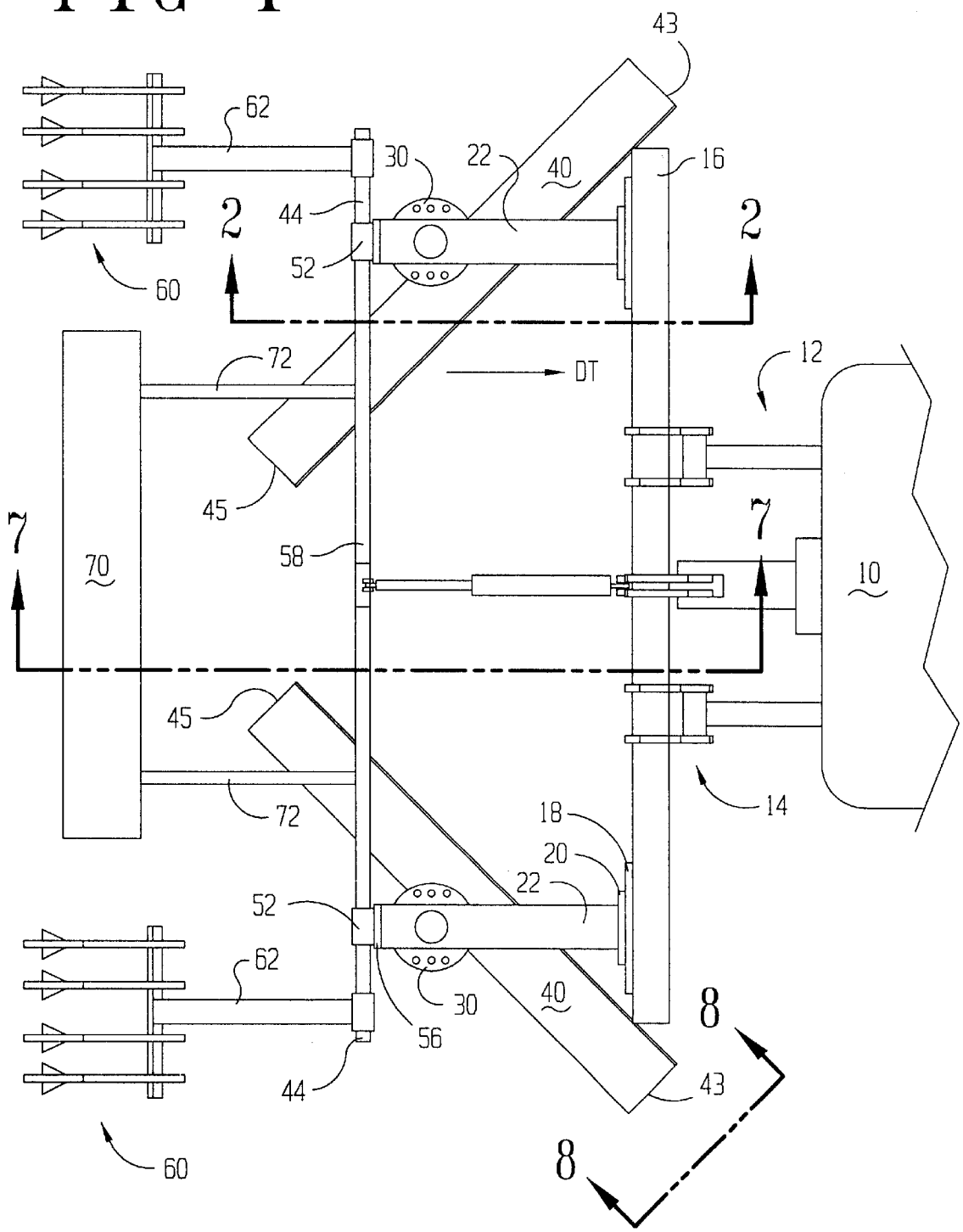
FIG. 1 is a top plan view of an embodiment of this invention attached to a tractor.
Figure 6:
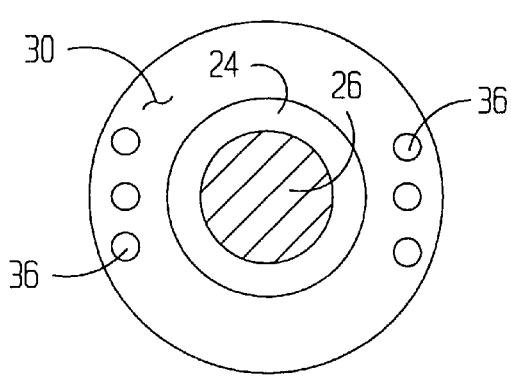
FIG. 6 is a sectional plan view of the tube disc taken substantially on line 6—6 of FIG. 2
Figure 5:
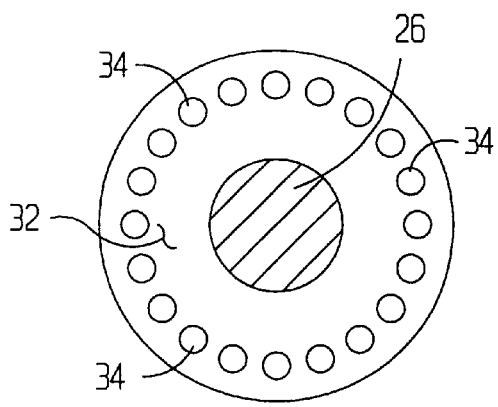
FIG. 5 is a sectional plan view of the shaft disc taken substantially on line 5—5 of FIG. 2.
Figure 8:
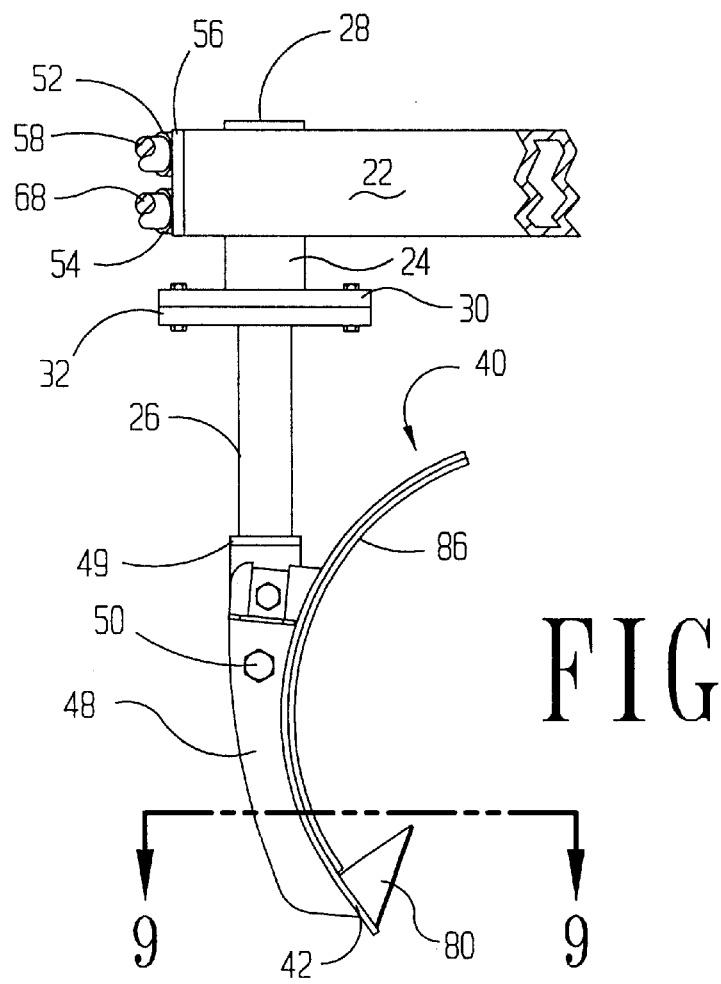
FIG. 8 is an elevational view taken substantially on line 8—8 of FIG. 1.

As an aid to correlating the terms of the claims to the exemplary drawing(s), the following catalog of elements and steps is provided:

| | | | |
|---|---|---|---|
| 10 | tractor | 48 | moldboard attachment |
| 12 | tractor three-point hitch | 49 | shaft attachment |
| | | 50 | pivot bolt |
| 14 | tool three-point hitch | 52 | plow tube |
| 16 | tool bar | 54 | board tube |
| 17 | bolt holes, bar | 56 | distal end plate |
| 18 | tool bar plate | 58 | plow shaft |
| 19 | bolt holes, arm | 60 | plows |
| 20 | arm plate | 62 | plow arms |
| 21 | bolts | 64 | plow rocker arm |
| 22 | arm | 66 | plow link |
| 24 | tube | 68 | board shaft |
| 26 | shaft | 70 | board |
| 28 | shaft cap | 72 | board arm |
| 30 | tube disc | 74 | board rocker arm |
| 32 | shaft disc | 76 | board link |
| 34 | shaft bolt holes | 80 | knives |
| 36 | tube bolt holes | 82 | blade |
| 38 | disc bolts | 84 | alignment |
| 40 | moldboard | 86 | plastic sheet |
| 43 | outboard end of moldboard | DT | direction of travel |
| | | α | angle of knife & D.T. |
| 44 | outboard end | | |
| 45 | inboard end of moldboard | | |

DESCRIPTION OF THE PREFERRED EMBODIMENTS(S)

Referring to the drawing there may be seen a partial representation of tractor 10. The tractor 10 has a tractor three-point hitch 12 which is connected to tool three-point hitch 14. The tool three-point hitch 14 is attached to tool bar 16. The tool bar is a heavy square tube. The tool bar 16 will be perpendicular to the direction of travel DT as shown by an arrow on the drawings. Near each of the ends on the rear of the tool bar, vertical bar plate 18 is welded to the tool bar, as seen in FIG. 2.

Referring to FIGS. 2 and 3 it may be seen that on the plate 18 there are a series of holes called bolt holes 17 above the top of the tool bar 16 and below the bottom of the tool bar 16.

Referring to FIG. 3 there may be seen the tool bar plate is which has bar bolt holes 17. Arm bolt holes 19, in vertical arm plate 20 FIG. 4, are in a pattern. As illustrated this pattern is two bolt holes at top and two bolt holes at the bottom of the arm plate 20. Referring to FIG. 3 it will be noted that the bar bolt holes 17 in the tool bar plate are a sequence of the pattern of bolt holes seen in FIG. 4. That is to say there is a center pattern of four bolt holes 17 in the tool bar plate which match the pattern of the bolt holes 19 in the arm plate. Also a series of the bolt holes in the plate 18 to the right are in the same pattern as the arm bolt holes 19. On the left of the bar plate there is also a series of bolt holes which match the pattern of bolt holes 19. It will be within the skill of the art that it might be a pattern of three or more bolt holes.

The tool bar plate is securely attached to the arm plate by plate bolts 21. It will understood that with the plates attached in this manner that the regardless of the rough use or abuse of the equipment will not cause the plates to shift in position so long as the bolts hold.

Arm 22 is securely attached to the arm plate 20. It is attached at its proximal end welded to the arm plate. At the distal end of the arm 22 vertical cylindrical tube 24 is inserted in the arm 22. The tube forming arm 22 is square in cross section. The outside diameter of the cylindrical tube 24 is smaller than the inside width of the square arm 22. A hole is cut in the arm 22 near the distal end thereof and the tube is welded within this opening.

Shaft 26 is journalled into the tube 24. Shaft cap 28 is welded to the upper end of the shaft 26, limiting the downward movement of the shaft.

A tube disc 30 is welded to the bottom of the tube 24. A shaft disc 32 is welded to the shaft 26. The tube disc 30 has a pattern of at least two tube bolt holes. Preferably they are spaced diametrically opposed. The shaft disc 32 has a plurality of shaft bolt holes. The shaft 26 may be locked by the disc bolts 38 through the bolt holes in the tube disc and shaft disc. Therefore it may be seen that regardless of the rough use or abuse the adjustment of the shaft will not be changed.

A moldboard 40 is attached to each of the shafts 26. The attachment of the moldboards to the shaft is conventional. That is the moldboard attachment 48 will include a pivot bolt 50. Likewise the shaft attachment 49 will have a corresponding pivot hole for receiving the bolt 50. In addition there will be provisions for an adjustment position with a series of holes so that the angle of the moldboard may be adjusted.

As may be seen FIG. 1 an outboard end 43 of each of the moldboards is approximately at the same location as the ends of the tool bar 16. Also the inboard end 45 of each of the moldboards is near the other inboard end 45 of the other moldboard. The inboard ends are behind the distal end of the arms 22.

The distal end of each arm 22 is closed by an end plate 56 welded thereto. Two cylindrical horizontal tubes are attached to each end plate 56. The upper horizontal tube is designated as the plow tube 52 and the lower tube is designated as the board tube 54. Plow shaft 58 is journalled through the plow tube 52. Plows 60 are attached to the plow shaft by plow arms 62. The plow arms and plows are mounted outboard end 44 of the plow shaft 58 which is out board of the plow tubes 52.

Rocker arm 64 is attached to the plow shaft 58 at the center of the plow shaft. A contractible and extendable plow link 66 connects the plow rocker arm 64 to the tool bar 16. When the link 66 is extended the plows 60 on the support arms 62 are lowered so the plows will cultivate the soil in that area. Likewise when the link is contracted the plows will be raised.

Board shaft 68 extends through the board tubes 54. Board 70 is attached by board arms 72 to the board shaft 68. Board rocker arm 74 is attached to the board shaft at the center thereof. Board link 76 extend from the board rocker arm 74 to the tool bar 16. The board link is contractible and extendable. By the contraction of the board link 76, the board is lowered and by the expansion of the board link, the board 70 is raised.

Preferably both of the links 76 and 66 are in the form of hydraulic cylinders so that they may be readily operated by the tractor operator.

It will be understood that with the board in the raised positions that the levee builder may be lowered by the three-point hitch and with forward movement of the tractor it will build a levee as in conventional. If it is desired, the plows may be lowered to cultivate the strip the moldboards have scraped. After each levee is built the builder can be raised by the three-point hitch while the tractor is maneuvered to the position to start the next levee.

After the levees are built and for any reason the levee is cut, with the builder raised so that the moldboards are above the ground that the board may be lowered and with the tractor moving rearward that the board can push dirt or soil onto the levee to repair any damage or cut which has been made in the levee.

The moldboards 40 each has a series of sharpen knives 80 to cut through the gumbo as it is shaped by the moldboard. The direction of draft, DT, is shown on FIG. 9 as an approximation. Although the knives 80 are in general direction of the direction of draft, DT, they are not exactly so. The purpose of the knives is first to cut strips or streamers of the gumbo. Without the knives, a blade 82 on the moldboards will form a sheet of gumbo which will flow up the moldboard.

The strips or streamers are an improvement over the sheet, however the strips do not form a good levee. Therefore the knives 40 are mounted on the moldboard so that there is a small angle $\alpha$ between the direction of travel and the alignment 84 of each knife.

The angle $\alpha$ is preferably more than five degrees.

This small angle $\alpha$ will cause sufficient change of direction of the strips or streamers of the gumbo to cause the strips to form smaller lumps. This is some what similar to crumbling the gumbo as it is formed into the levee.

The main portion of the moldboard is covered with a plastic sheet 86 of material. The use of plastic coating or covers on agriculture parts used in cultivating gumbo is known to the art. The plastic covering on the moldboard is a high molecular weight polyethylene.

The knives 80 are attached by welding to the blade 82. The blades extends the full length of the bottom of the moldboard 40 and is attached to the bottom of the moldboard by bolts extending through matching holes in the blade and the bottom of the moldboard.

At the present time the knives 80 are placed on the blade 82 at a 45 degree angle and that they have five inch base and 5 inch rise. The knives are triangular shape with the hypotenuse being sharpened to cut through the gumbo.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to point out the advantages and the progressive contribution to the agricultural arts and to enable one skilled in the art to make and use the invention. The limits of the invention and the bounds of the patent protection are measured by and defined in the following claims.

We claim as our invention:

1. A method of moving gumbo comprising:
   a) cutting a sheet of gumbo from its position on the top of a field with a blade,
   b) raising and curving the gumbo with a moldboard attached to the blade,
   c) cutting the gumbo into strips as it is raised, and
   d) moving the gumbo by opposing moldboards into a levee.

2. A method of moving gumbo comprising:
   a) cutting a sheet of gumbo from its position on the top of a field with a blade,
   b) cutting the sheets of gumbo into strips by knives on the blade,
   c) raising the gumbo by the blade and curving the gumbo with a moldboard attached to the blade,
   d) breaking the strips of gumbo into lumps as it is raised, by
   e) angling the knives more than five degrees to the direction of travel of the knives, and
   f) moving the gumbo by opposing moldboards into a levee.

* * * * *